(12) United States Patent
Johanson et al.

(10) Patent No.: US 7,725,343 B2
(45) Date of Patent: May 25, 2010

(54) ACTIVITY BASED COST MODELING

(75) Inventors: Stephen W. Johanson, Menlo Park, CA (US); Matthew J. Faulkner, Oakland, CA (US); Joseph D. Ray, San Ramon, CA (US)

(73) Assignee: GTM Consulting, LLC, San Diego, CA (US)

( * ) Notice: Subject to any disclaimer, the term of this patent is extended or adjusted under 35 U.S.C. 154(b) by 1489 days.

(21) Appl. No.: 10/992,035

(22) Filed: Nov. 16, 2004

(65) Prior Publication Data

US 2006/0106658 A1   May 18, 2006

(51) Int. Cl.
*G05B 19/418* (2006.01)
(52) U.S. Cl. .......................................... 705/8
(58) Field of Classification Search .................. 705/8
See application file for complete search history.

(56) References Cited

U.S. PATENT DOCUMENTS

| | | | |
|---|---|---|---|
| 5,799,286 A | 8/1998 | Morgan et al. | |
| 5,970,476 A | 10/1999 | Fahey | |
| 6,330,545 B1* | 12/2001 | Suh | 705/30 |
| 6,490,569 B1 | 12/2002 | Grune et al. | |
| 6,507,825 B2 | 1/2003 | Suh | |
| 7,149,700 B1* | 12/2006 | Munoz et al. | 705/8 |
| 2001/0047274 A1 | 11/2001 | Burton | |
| 2002/0123945 A1* | 9/2002 | Booth et al. | 705/30 |
| 2003/0144932 A1* | 7/2003 | Martin et al. | 705/32 |
| 2003/0236721 A1* | 12/2003 | Plumer et al. | 705/30 |
| 2004/0243438 A1* | 12/2004 | Mintz | 705/2 |

OTHER PUBLICATIONS

Disch, Thomas R., Activity Analyzer Management Accounting, Apr. 1994, vol. 75, No. 10.*
Compton, Ted R., Implementing Activity-Based Costing The CPA Journal, vol. 66, No. 3, Mar. 1996.*
Villarreal, Humberto, The Application of Activity Based Management to a Software Engineering Environment IEEE, 1993, CH3306.*
Murray, Best, Software The Engine of ABC CMA, vol. 70, No. 4, May 1996.*
Otitigbe, Eto, Enablers and Barriers to Successful Implementation of Activity-Based Costing in the Defense Aircraft Industry Massachusetts Institute of Technology, May 1999.*

(Continued)

*Primary Examiner*—Scott L Jarrett
(74) *Attorney, Agent, or Firm*—Alex U. Witkowski

(57) ABSTRACT

A computer system, computer-readable medium and a method for performing activity based cost modeling. A cost object array has dimensions defined by weight arrays each corresponding to facets of the business by which one would assess profitability and efficiency, such as by products and customers. Each element of the weight arrays represents a user-definable classification, such as particular product families or geographic regions, and is assigned an allocation weight. A cost driver array has the same dimensions as the cost object array comprising metrics, such as the quantity sold or dollars of revenue. A weighted allocation factor for each cost object is a function of the allocation weights and the cost driver for that cost object, normalized over all the cost objects. Activity costs are allocated to a particular cost object in proportion to the weighted allocation factor associated with that cost object.

14 Claims, 11 Drawing Sheets

OTHER PUBLICATIONS

Zhu, Jianxin, Four-Stage Activity based Costing (ABC) System Modeling and Computer-Based Application Design West Virginia University, 1999.*

Cokins, Gary et al., An ABC Manager's Primer McGraw-Hill, 1992, ISBN 0-86641-220-4.*

Horngren, Charles T. et al., Cost Accounting—A Managerial Emphasis—Tenth Edition Prentice Hall, 2000, ISBN: 0-13-760554-4.*

Gessford, John, Object-oriented cost accounting system design Journal of End User Computing, vol. 5, No. 3, Summer 1993.*

"Activity Based Costing: Accounting for Operational Readiness," The LearningSource, from www.dtic.mil/comptroller, Aug. 13, 2002.

Somogyi, George L. et al., "The Mysteries of Activity Based Costing in Oracle Applications Release 10.7SC," Arthur Andersen, Mar. 23, 1999.

Wood, Rahnl, "Quality/Activity-Based Costing: A Compilation of Academic Modules in Accounting, Educational Leadership, and Theatre Communication" from www.nwmissouri.edu.

Tham, Donald K. et al., Determining Requirements and Specifications of Enterprise Information Systems for Profitability, ICEIS 2004.

Roztocki, Narcyz et al., "A Procedure for Smooth Implementation of Activity Based Costing in Small Companies," Jul. 26, 1999.

Cokins, Gary, "Are All of Your Customers Profitable to You?," SAS, 2003.

Cokins, Gary, "Activity-Based Cost Management," SAS, 2002.

"As Easy as ABC," Assist Pay Ltd., Apr. 1998.

"Activity Based Costing and Business Process Reengineering: A Combined Strategic Management Tool," Jaekel & Associates, Ltd., Nov. 27, 2002.

Chapter 5, Business Process Improvement (Reengineering): Handbook of Standards and Guidelines, Information Technology Services, Nov. 30, 1995.

Cokins, Gary, Activity Based Cost Management Making It Work, Apr. 1996, pp. 52-97.

* cited by examiner

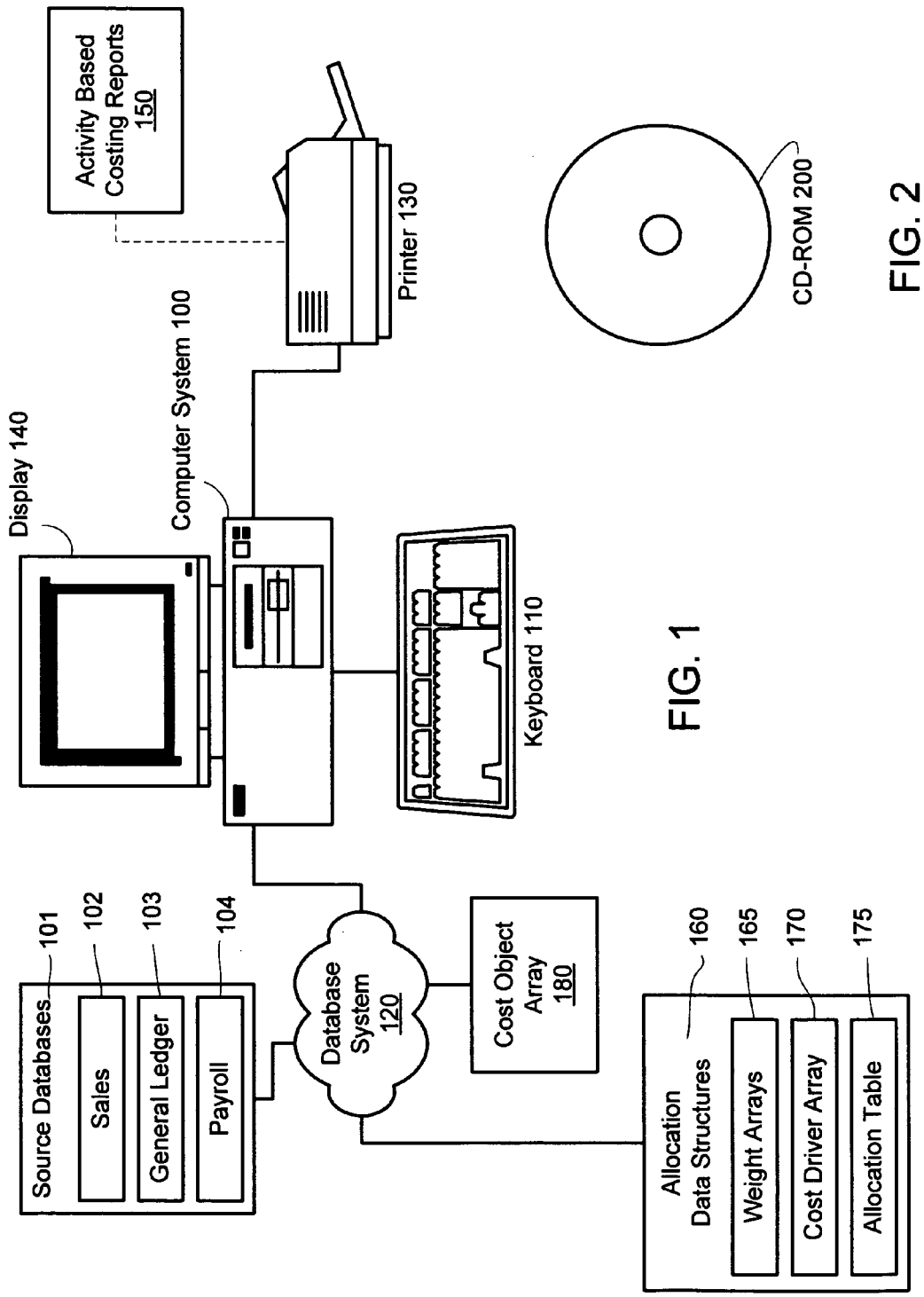

Channel Weight Array 695

| 601 | 602 | 603 |
|---|---|---|
| 1 | 3 | 0 |

| | | | |
|---|---|---|---|
| 641 / 0 | 0 _611_ | 0 _612_ | 0 _613_ |
| 642 / 1 | 454 _614_ | 74 _615_ | 276 _616_ |
| 643 / 2 | 921 _617_ | 88 _618_ | 22 _619_ |
| 644 / 1 | 829 _620_ | 424 _621_ | 632 _622_ |
| 645 / 1 | 32 _623_ | 0 _624_ | 543 _625_ |
| 646 / 0 | 0 _626_ | 0 _627_ | 0 _628_ |
| 647 / 0 | 0 _629_ | 0 _630_ | 0 _631_ |
| 648 / 0 | 0 _632_ | 0 _633_ | 0 _634_ |

Product Weight Array 696

Cost Driver Array 170

— 170

Cost Driver Array

Channel ID
Product ID — 691

Revenue
Direct Cost of Goods Sold
Transactions
Units Sold
Line Items on an Order
Orders — 692
Returns
Shipments
Coupons Used
Credit Card Transactions
Cash Transactions
Check Transactions
Total Weight of Orders
Total Volume of Orders

| Cost Object ID | Channel ID | Product ID | Selected Allocation Weight (Channel) | Selected Allocation Weight (Product) | Selected Cost Driver (Weight of Orders) | Calculated Weighted Allocation Factor | Allocated Cost |
|---|---|---|---|---|---|---|---|
| 921 | 601 | 642 | 1 | 1 | 454 | 454/5179 | $88 |
| 922 | 602 | 642 | 3 | 1 | 74 | 222/5179 | $43 |
| 923 | 601 | 643 | 1 | 2 | 921 | 1842/5179 | $356 |
| 924 | 602 | 643 | 3 | 2 | 88 | 528/5179 | $102 |
| 925 | 601 | 644 | 1 | 1 | 829 | 829/5179 | $160 |
| 926 | 602 | 644 | 3 | 1 | 424 | 1272/5179 | $246 |
| 927 | 601 | 645 | 1 | 1 | 32 | 32/5179 | $6 |

Table 1

FIG. 10

| Cost Object ID | Channel ID | Product ID | Selected Allocation Weight (Channel) | Selected Allocation Weight (Product) | Selected Cost Driver (Weight of Orders) | Calculated Weighted Allocation Factor | Allocated Cost |
|---|---|---|---|---|---|---|---|
| 921 | 601 | 642 | N/A | 1 | 454 | 454/3157 | $58 |
| 922 | 602 | 642 | N/A | 1 | 74 | 74/674 | $66 |
| 923 | 601 | 643 | N/A | 2 | 921 | 1842/3157 | $233 |
| 924 | 602 | 643 | N/A | 2 | 88 | 176/674 | $157 |
| 925 | 601 | 644 | N/A | 1 | 829 | 829/3157 | $105 |
| 926 | 602 | 644 | N/A | 1 | 424 | 424/674 | $377 |
| 927 | 601 | 645 | N/A | 1 | 32 | 32/3157 | $4 |

Table 2

FIG. 11

ACTIVITY BASED COST MODELING

BACKGROUND OF THE INVENTION

1. Field of the Invention

The present invention relates in general to the field of business analysis and planning and, more specifically, to activity based cost management.

2. Description of Related Art

Activity Based Cost (ABC) Modeling is a useful financial tool for managers to make strategic and operational decisions. Business organizations manage detailed information about their sales structure and their cost structure. Sales information is collected by individual transactions that can be directly classified by facets such as date, store, stocking keeping units (SKUs), quantity, price, customer and payment method. General ledger and payroll costs are collected by functional information such as account and department codes. ABC modeling is used to allocate general ledger and payroll costs to cost objects that are organized by facets of the revenue classification system. By matching costs with associated revenue in each revenue classification, profitability analysis by revenue classifications can be performed.

ABC systems reorganize costs by allocating costs to activities and activities to cost objects. Traditional ABC systems are configured using formulas to specify relationships between activity costs and cost drivers. These ABC systems employ user-interfaces for entering formulas and use interpreters to solve these formulas. Establishing a set of formulas for each activity-to-cost-driver relationship is a time consuming process and is difficult for some users to manage conceptually.

Traditional ABC systems use data structures that are coded into the ABC program such that the classification system for cost objects is fixed in the code. Since ABC analysis is often an iterative process in which classification systems and allocation formulas are frequently changed. Changing the classification system often requires revising the ABC program and recompiling it. Furthermore, changing the classification of cost objects changes the organization of the cost driver information, often requiring that the formulas be modified. Management decision making based on ABC analysis would benefit by a flexible system in which classifications and allocation schemes can be easily set, modified, and updated.

Traditional ABC systems generate management reports that present cost objects in classifications that do not distinguish between specific cost elements in the general ledger. It would be useful to be able to trace costs back to the general ledger, so that each cost object could be broken down by the cost elements of the general ledger. An analysis of cost objects by general ledger classifications can provide useful information for strategic and operational decision-making. Additionally, the absence of the ability to reconcile to the general ledger, reduces the credibility of the results of the traditional ABC system.

SUMMARY OF THE INVENTION

A computer system, computer-readable medium and a method for performing activity based cost modeling for an organization, wherein activity costs are allocated among multiple cost objects within a cost object array.

The cost object array is a multidimensional array by which costs are classified. Each dimension of the cost object array corresponds to a facet of the revenue classification system. Facets can include products, customers, channels, sales regions and vendors, for example. Each category within the product facet, for example, can include individual products or groups of products. Each cost object is associated with a single category from each facet.

Each dimension of the cost object array has at least one corresponding weight array in which each element of the weight array corresponds to a category within the associated facet. For example, each element of a product weight array corresponds to an individual product or group of products associated with a category of the product facet. Each element of a weight array is assigned an allocation weight. For example, a product weight array has allocation weights, each corresponding to a category of products.

A cost driver array includes cost driver objects corresponding to each cost object. Each cost driver object has records corresponding to particular cost driver types associated with that cost driver object. Cost driver types can include revenue, the number of orders and the total volume of orders, for example. In an embodiment, the cost driver object corresponding to a particular product category, customer category and sales region category includes a revenue record indicating the revenue received from sales associated with that product category, customer category and sales region category.

Each activity cost is allocated among the cost objects based on the weight arrays and the cost driver type associated with that activity cost. In one embodiment, a weighted allocation factor for each cost object is the product of the allocation weights and the cost driver for that cost object, normalized over all the cost objects. The activity cost is allocated to cost objects according to the product of the activity cost and the weighted allocation factor for the respective cost object.

In other embodiments, the weighted allocation factor for each cost object is another function of the allocation weights and the corresponding cost driver for that cost object. Other features and advantages of the present invention will be apparent from the accompanying drawings and the detailed description that follows.

BRIEF DESCRIPTION OF THE DRAWINGS

The present invention is illustrated by way of example and not by way of limitation in the figures of the accompanying drawings.

FIG. 1 is a block diagram of a computer system of an example embodiment.

FIG. 2 is an example of a computer readable medium for storing instructions which, when executed, perform a method of an embodiment of the present invention.

FIG. 6A is a diagram of the relationship between the cost driver array and the weight arrays according to an example embodiment.

FIG. 6B is an alternate representation of the cost driver array illustrated in FIG. 6A according to an example embodiment.

FIG. 10 is a table showing allocation values used in the allocation method for the example embodiment illustrated in FIG. 9.

FIG. 11 is a table showing allocation values used in the allocation method for an alternative example embodiment.

DETAILED DESCRIPTION

Figure 3:
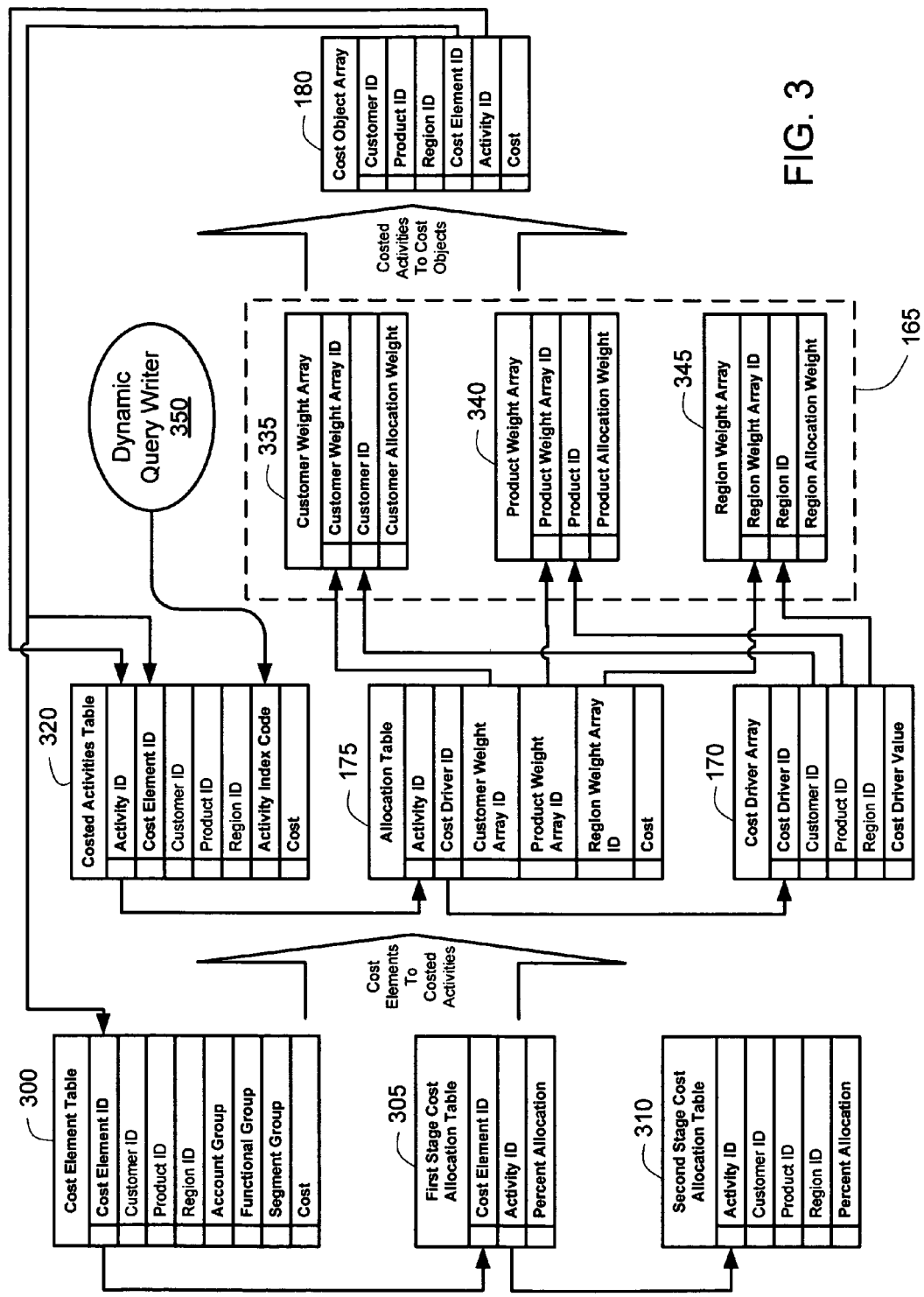
FIG. 3 is a diagram of a set of data structures of an embodiment.

The present invention relates to activity based cost (ABC) modeling and planning for management of an organization. The following description provides numerous specific details such as specific cost objects, weight arrays, cost drivers, data structures and database architectures in order to provide a more thorough understanding of the present invention. It will be appreciated, however, by one skilled in the art that the invention may be practiced without such specific details. In other instances, methods, data structures, and apparatus have not been shown in order not to obscure the invention. Those of ordinary skill in the art, with the included descriptions, will be able to implement appropriate computer systems, software, processes and data structures to implement the invention without undue experimentation.

FIG. 1 illustrates an embodiment of an ABC modeling system. A computer system 100 is configured to perform a method of the present invention as described herein. The computer system 100 is coupled to a keyboard 110 to receive input from a user and coupled to a printer 130 and a display 140 to generate output such as activity based costing reports 150. The computer system 100 is configured to retrieve instructions and/or data from a local hard drive, removable media such as a CD-ROM, and a database system 120.

A set of source databases 101 store financial and operational data for the organization. The source databases 101 include a sales database 102, a general ledger database 103 and a payroll database 104. The sales database 102 includes sales transaction information such as the customer, product, sales region, sales channel and vendor associated with each transaction. By using this associated information, revenue can be classified by facets such as customer, product, sales region, sales channel and vendor. The general ledger 103 and the payroll 104 contain cost information classified by account group, functional group and segment group. ABC modeling is used to allocate general ledger and payroll costs to activity costs and then allocate the activity costs to cost objects that are organized by facets of the revenue classification system. By matching costs with associated revenue in each revenue classification, profitability analysis by revenue classifications can be performed.

Because information used to classify revenue is not stored within each entry in the general ledger 103 and the payroll 104, costs cannot be directly classified by the same facets as revenue. By using a set of allocation data structures 160 to control the allocation of costs from the general ledger 103 and the payroll 104 to a cost object array 180 organized by facets of revenue, costs can be matched with the respective revenue allowing the computation of a profit or loss value for each revenue classification. The allocation data structures 160 include a set of weight arrays 165, a cost driver array 170 and an allocation table 175. In one embodiment, the allocation data structures 160 are easily modified by a user such that iterative ABC analysis can be efficiently performed.

The cost object array 180 is a multidimensional array by which the costs from the source databases 101 are classified. Each dimension corresponds to a facet of the revenue classification system. Categories within a product facet, for example, can include individual products or groups of products. A cost object is associated with a single category from each facet. Each combination of a category from each facet is associated with a single cost object to which costs associated with that combination of categories are allocated.

Each dimension of the cost object array 180 has at least one corresponding weight array in the set of weight arrays 165, one of which is selected based on the activity associated with each activity cost to be allocated. Each element of each of the selected weight arrays corresponds to a category within the associated facet. For example, each element of a product weight array corresponds to one or more products in a category of the product facet. Each element of a weight array is assigned an allocation weight. For example, a product weight array has allocation weights, each corresponding to a category of products. For the activities referencing that product weight array, the allocation weight for a particular category of that facet relative to the allocation weights assigned to other categories is a factor in determining how much of the activity costs are allocated to that category relative to the other categories. Every cost object is associated with an allocation weight for a category from each facet.

The cost driver array 170 includes cost driver objects. Each cost driver object corresponds to a cost object. Cost drivers can include any metric for the organization that can be used as a basis to allocate costs. Cost drivers can include revenue, the number of orders and the total weight of orders, for example. The cost driver type is generally selected based on the activity associated with the activity cost to be allocated. For example, the activity cost for order taking can be allocated on the basis of the number of orders and the activity cost of shipping can be allocated on the basis of the total weight of orders. Every cost driver object is associated with a category from each facet. The cost driver values for each of the cost driver types in that cost driver object is the portion of that cost driver associated with that combination of categories. For example, the revenue cost driver value for each cost driver object is the sum of revenue associated with the corresponding combination of categories.

Activity costs are allocated among the cost objects based on the weight arrays 165 and the cost driver array type selected for each activity. The allocation table 175 selects one of the weight arrays 165 for each facet of the cost object and a cost driver type for each activity. A weighted allocation factor for a particular cost object is a function of the allocation weights for the corresponding elements of each weight array and the selected cost driver type from the corresponding cost object of the cost driver array 170. In one embodiment, the weighted allocation factor is the product of the allocation weights and the corresponding cost driver, normalized over all the cost objects. In another embodiment, the weighted allocation factor is the product of the corresponding cost driver and the geometric mean of the allocation weights, normalized over all the cost objects. An activity cost is distributed among cost objects according to the product of the activity cost and the weighted allocation factor associated with each cost object.

The cost object array 180 is used as a basis for generating activity based costing reports 150. The activity based costing reports 150 can be used to support business planning activities such as trend analysis, process value analysis, benchmarking, cost of quality, business process reengineering, target costing, product mix rationalization, supplier certification, make versus buy analysis, profitability analysis, cost driver analysis, trade-off decision-making, pricing decisions and quote generation.

In one embodiment, the computer system 100 is an IBM-compatible computer running under the Microsoft Windows® XP operating system connected to a local area network coupled to the Internet. In other embodiments, the computer system 100 is a workstation or other processor-based system. In one embodiment, the database system 120 stories the source databases 101, the allocation data structures 160 and the cost object array 180 as OLAP cubes. Other user-input devices, such as a handwriting recognition device or a speech recognition device may be used for user input in conjunction with or instead of the keyboard 110. It will be apparent to a skilled practitioner that the ABC modeling system can be implemented in a broad range of configurations.

FIG. 2 shows an example embodiment of a machine-readable medium of the present invention. A CD-ROM 200 is a compact disc read-only memory that stores instructions for a processor such that when the processor-based machine, such as the computer system 100, reads such instructions, the processor executes a method of the present invention. Other machine-readable mediums, such as a hard disk drive, a floppy disk and a flash memory based device, can be used to store the instructions.

FIG. 3 is a diagram of a set of data structures according to an example embodiment of the present invention.

A cost element table 300 is created from the source databases 101. Each record of the cost element table 300 is assigned a cost element ID and a cost that is the cumulative cost of a particular combination of an account group, a functional group and a segment group from the source databases 101. A configuration process described with reference to FIG. 4 can assign zero, one or more facet IDs to each cost element record. The cost element table 300 has cost elements that can be classified according to three facets using a customer ID, a product ID and/or a region ID.

A first stage cost allocation table 305 has records that are selected by a cost element ID from the cost element table 300. Each cost element ID references one or more records of the first stage cost allocation table 305. Each referenced record includes an activity ID and a percent allocation indicating the percent of the cost associated with the cost element ID that is allocated to the activity associated with the activity ID. All of the cost associated with a cost element ID is allocated to the activities associated with the records of the first stage cost allocation table 305 referenced by that cost element ID.

A second stage cost allocation table 310 has records that are selected by the activity ID in the first stage cost allocation table 305. If an activity ID references one or more records of the second stage cost allocation table 305, each referenced record includes one or more facet IDs and a percent allocation indicating the percent of the cost associated with the activity ID that is allocated to the combination of facet IDs specified in that referenced record in the second stage cost allocation table 305. All of the costs associated with the activity ID is allocated to the one or more records of the second stage cost allocation table 310 referenced by that activity ID. In one embodiment, some activity ID's do not reference any records in the second stage cost allocation table 305 because they cannot be directly allocated to a facet ID.

The cost element table 300, the first stage cost allocation table 305 and the second stage cost allocation table 310 are used to create a costed activities table 320 as described with reference to FIG. 4. The costed activities table 320 includes one or more records for each cost element ID. Each record in the costed activities table 320 includes: the cost element ID linking that record to the associated record in the cost element table 300, the activity ID linking that record to an associated activity and a cost which is the portion of the cost associated with the cost element ID that is directly allocated to the associated activity. Some records include one or more facet IDs associating that record with the specified facet IDs indicating that the cost is also directly allocated to the specified facet IDs. All of the cost associated with the cost element ID is allocated to the records of the costed activities table 320 referenced by that cost element ID.

Each record in the costed activities table 320 includes an activity index code that is a binary number having bits corresponding to each of the facets, each bit indicating whether the associated facet is indexed for that activity. The dynamic query writer 350 uses the activity index code to create the specific queries that join the costed activities table 320 to the cost driver array 170. If a costed activity record in the costed activities table 320 is indexed by one or more facets, then the query writer will establish a joined data field between the facet ID of the costed activities record and the cost driver array 170 for only those facets which have indexes in that costed activity record. In this way, the costed activities are only allocated to the cost objects that correspond to the facet IDs specified in the costed activity record.

The allocation table 175 has records that are selected by an activity ID from the costed activities table 320. Each record in the allocation table 175 includes a cost driver ID indicating the cost driver type associated with that activity ID, and multiple facet weight array IDs each being used to select the weight array for that facet based on the activity ID.

A customer weight array table 335 has customer weight arrays selected by a customer weight array ID from the allocation table 175 and elements within the selected customer weight array selected by a customer ID from the cost driver array 170. Each element of the selected customer weight array has a customer allocation weight. The customer ID indicates the customer category within the customer facet associated with the customer allocation weight. A product weight array table 340 and a region weight array table 345 are organized similarly.

The costed activities table 320, the allocation table 175, the cost driver array 170 and the weight array tables 335, 340 and 345 are used to allocate costed activities to the cost object array 180. The cost object array 180 includes cost objects each having a cost and a facet ID for each facet. Each record in the cost object array 180 also includes a cost element ID linking the cost to the associated record in the cost element table 300 and an activity ID linking the cost to the associated activity cost. Each record in the cost object array 180 can be directly traced back to the cost element table 300 by using the cost element ID. Each record in the cost object array 180 can be traced back to the costed activities table 300 by using the cost element ID and the activity ID. Furthermore, the allocated cost for each combination of facet IDs can be matched with the sales revenue classified by the same facet IDs to allow for EBIT analysis by those facets.

Figure 4:
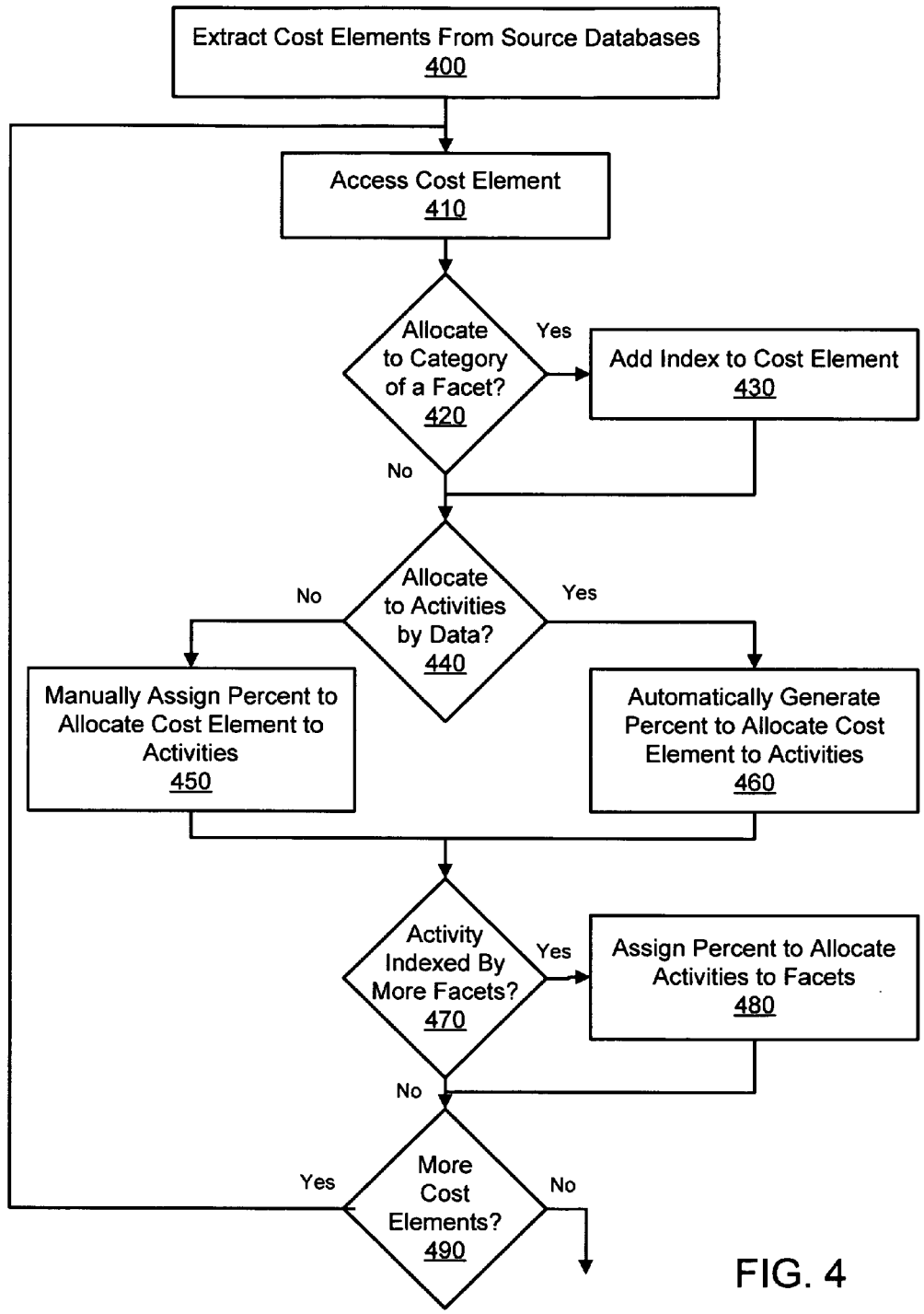
FIG. 4 is a flow diagram showing a method of configuring allocation data structures according to one embodiment.

FIG. 4 illustrates a flow diagram of the process for configuring some of the data structures illustrated in FIG. 3. Prior to this process, the facets by which costs are to be organized and the categories within those facets are specified. In one embodiment, the detail associated with each revenue transaction in the source databases 101 determines the facets and the level of granularity in the categorization within those facets. A facet may have very specific categories at its lowest level, sometimes to specific transaction and stock keeping units (SKUs). Categories may be grouped according to a hierarchy in order to more easily manage facets that have numerous categories.

In step 400, the cost element table 300 is created from the source databases 101. Each record of the cost element table 300 is assigned a cost element ID identifying the cost element storing the cumulative cost of a unique combination of account group, functional group and segment group within the source databases 101.

In step 410, a cost element is accessed from the cost element table 300.

In step 420, it is determined whether the accessed cost element can be directly allocated to a category within one or more facets. For example, a cost element linked to a particular account group, functional group and segment group may be inherently associated with a particular product category, a particular customer category and/or a particular region category. In that case, step 430 is performed. Otherwise, step 440 is performed.

In step 430, one or more indexes are added to the accessed cost element record. If the cost element is associated with a particular product category, a product ID associated with that product category is added to the cost element record. If the cost element is associated with a particular customer category, a customer ID associated with that customer category is added to the cost element record. If the cost element is associated with a particular region category, a region ID associated with that region category is added to the cost element record. For example, a cost element associated with a call center can have distinct segment groups based on the region from which that call center fields calls. In that case, the cost elements for the call centers are assigned a region ID corresponding to the region category associated with the segment group. Step 440 is performed next.

In step 440, it is determined if there is allocation data from the source databases 101 that can be used to allocate the cost element among two or more activities. This allocation data is similar to cost driver types in the cost driver array in that the allocation of costs are based on it, but it is distinguished from the cost driver array in that the scope of the allocation data is generally limited to particular activities and/or specific cost elements. If the cost element can be allocated by allocation data, step 460 is performed. Otherwise step 450 is performed.

In step 450, percent allocations are manually assigned. The percent allocation for each activity is based on information that is not available in the source databases 101. For example, CEO salary can be allocated among strategic long-range planning activity, key customer visit activity, board meeting activity, operational planning activity and other activities based on the CEO's hours dedicated to each activity and/or business judgment, for example.

A record in the first stage cost allocation table 305 is created for each allocation in this step. In some cases, 100 percent of the cost associated with the cost element is allocated to a single activity. In those cases, one record is created in the first stage cost allocation table 305 having an activity ID associated with that single activity and a percent allocation of 100 percent. In other cases, the cost element is allocated among several activities. In those cases, a record in the first stage cost allocation table 305 is created for each of the several activities. Each of these records includes an activity ID specifying one of the several activities and a percent allocation specifying the portion of the cost associated with that cost element to be allocated to that activity. The next step performed is step 470.

In step 460, percent allocations are automatically assigned based on the allocation data relevant to the activities associated with the accessed cost element. For example, when allocating a distribution center cost element between receiving, stocking and outbound activities, the allocation data can be the receiving headcount, the stocking headcount and the outbound activities headcount for that distribution center. This allocation data is accessed from the source databases 101 and used to automatically determine percent allocations for the first stage allocation table 305. In the distribution center example, three records would be created in the first stage cost allocation table 305 corresponding to the receiving activity, the stocking activity and an outbound activity, respectively. The percent allocation for each record would correspond to the percentage of the headcount associated with that activity. The cost associated with the accessed cost element would be allocated to these three activities accordingly.

In another example, when allocating call center activity costs, the cost element for a call center can be assigned to three activities: a sales activity, a technical support activity and a customer service activity based on the allocation data such as the number of sales calls, the number of technical support calls and the number of customer service calls for that call center. In the call center example, three records would be created in the first stage cost allocation table 305 corresponding to the sales activity, the technical support activity and a customer service activity. The percent allocation for each record would correspond to the percentage of the calls associated with that activity. The cost associated with the accessed cost element would be allocated to these three activities accordingly.

In another example, there are two cost elements associated with different call centers, each having a distinct segment group and a distinct region ID indicating that the call centers are in distinct region categories. The allocation data can include the number of calls for each activity broken down by call center. The cost associated with the cost element for each call center would be allocated to the three activities based on the number of calls for that call center. In another embodiment, the costs associated with the cost elements for both call centers are allocated to each activity based on the aggregate number of calls for that activity among all the call centers. The next step performed is step 470.

In step 470, it is determined whether each activity added to the first stage cost allocation table 305 can be split between at least two categories with a facet. An activity is indexed by a facet if that activity is directly associated with one or more categories within that facet. For example, a merchandising activity can be directly split between multiple product categories according to user-defined percentages based on business judgement.

In step 480, two or more records are created in the second stage cost allocation table 310. Each record in the second stage cost allocation table 310 has an activity ID referenced by a record in the first stage cost allocation table 305, at least one facet ID specifying a category within the facet to which that the activity is directly allocated and a percent allocation indicating the percentage of the activity cost associated with the activity ID that is directly allocated to the facet IDs specified in this record. If the activity is associated with a particular customer category, a customer ID associated with that customer category is added to the record in the second stage cost allocation table 310. If the activity is associated with a particular product category, a product ID associated with that product category is added to the record in the second stage cost allocation table 310. If the activity is associated with a particular region category, a region ID associated with that region category is added to the record in the second stage cost allocation table 310. For example, a merchandising activity can be directly allocated to products based on business judgement. A first record for that merchandising activity is assigned a product ID specifying a first product and the allocation percent for the first product and a second record for that merchandising activity is assigned a product ID specifying a second product and the allocation percent for the second product. The next step performed is step 490.

In step 490, it is determined whether there are more cost elements in the cost element table 300. If there are more cost elements in the cost element table 300, step 410 is performed to access the next cost element. Otherwise, the flow diagram is completed.

Figure 5:
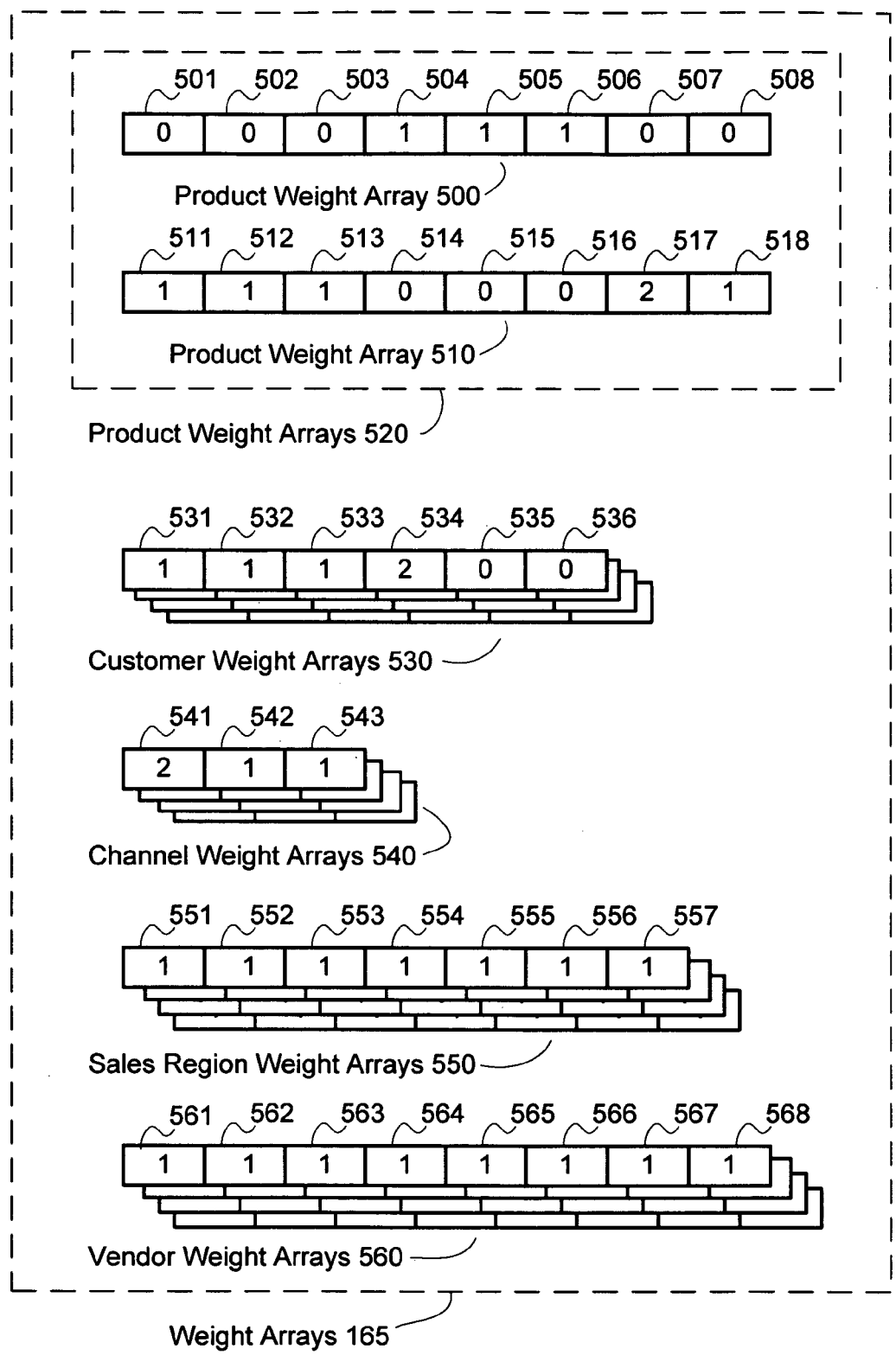
FIG. 5 illustrates a set of weight arrays having allocation weights according to an embodiment.

FIG. 5 illustrates one embodiment of the set of weight arrays 165 of the present invention including a set of product weight arrays 520, a set of customer weight arrays 530, a set of channel weight arrays 540, a set of sales region weight arrays 550 and a set of vendor weight arrays 560. Each of the various sets of weight arrays within the set of weight arrays 165 are associated with a facet by which costs are allocated. For example, the set of product weight arrays 520 are associated with the product line sold by the organization. The set of product weight arrays 520 includes a product weight array 500 and a product weight array 510.

The product weight array 500 has multiple elements, each representing one of the product categories for the product facet. For each element, an allocation weight for the product category is assigned to that element. An element 501 contains an allocation weight for a first product category, an element 502 contains an allocation weight for a second product category, an element 503 contains an allocation weight for a third product category, an element 504 contains an allocation weight for a fourth product category, an element 505 contains an allocation weight for a fifth product category, an element 506 contains an allocation weight for a sixth product category, an element 507 contains an allocation weight for a seventh product category, and an element 508 contains an allocation weight for an eighth product category.

Similarly, the product weight array 510 includes elements 511-518. Each of the elements 511-518 corresponds to the same product category as the respective one of the elements 501-508. Each product allocation weight defines the relative weight for allocation of an activity cost across the categories of the product facet for that product weight array. One of the product weight arrays 520 is assigned to each activity based on the combination of relative weighting across the categories of products for that activity.

The product weight arrays 520 can include more than two product weight arrays in order to describe additional relative weighting combinations for the set of activities for that organization. Furthermore, the product weight arrays 520 can be configured to have more or less than eight allocation weights, depending on how many categories of products or services are selected for that organization.

In one example, the product weight array 500 is associated with a stocking activity. Stocking is relevant for physical products but not for services since services do not need to be stocked. The product weight array 510 is associated with a service quality control activity. Service quality control is not relevant to the physical products for that organization. In this example, the element 501 and the element 511 are associated with a service based product and the element 504 and the element 514 are associated with a physical product.

Since the stocking activity associated with the product weight array 500 is not relevant to the service corresponding to the element 501, the element 501 is assigned an allocation weight of zero. Since the service quality control activity associated with the product weight array 510 is relevant to the service corresponding to the element 511, the element 511 is assigned an allocation weight of one.

Since the stocking activity associated with the product weight array 500 is relevant to the product associated with the element 504, the element 504 is assigned an allocation weight of one. Since the service quality control activity associated with the element 510 is not relevant to the product associated with the element 514, the element 514 is assigned an allocation weight of zero.

Some costs may be disproportionately associated with a particular category of products and services. For example, the element 517 is assigned an allocation weight of two indicating that the cost for service quality control is allocated in greater proportion to the services associated with the element 517 as compared to the services associated with the element 518, for example, which is assigned an allocation weight of one.

The set of customer weight arrays 530 includes customer weight arrays each having a set of elements that are associated with categories of customers for the organization. Each of the customer weight arrays is assigned to at least one activity based on the combination of allocation weights selected for that activity. For example, an element 534 can be assigned a weight of two because the customer associated with that element is more demanding on customer service than the customer associated with an element that is assigned a weight of one, such as an element 533.

The set of channel weight arrays 540 includes channel weight arrays having a set of elements that are associated with categories of sales channels for the organization. The set of sales region weight arrays 550 includes sales region weight arrays having a set of elements that are associated with categories of sales regions for the organization. The set of vendor weight arrays 560 includes vendor weight arrays having a set of elements that are associated categories of vendors supplying the organization.

It will be apparent to one skilled in the art that the set of product weight arrays 520 may include more than two product weight arrays in order to define additional relative weighting combinations for the set of activities performed by the organization. Furthermore, the number of weight arrays for each of the sets of customer weight arrays 530, channel weight arrays 540, sales region weight arrays 550 and vendor weight arrays 560 may be independently selected depending on the number of unique relative weighting combinations across the categories corresponding to the respective facet.

Furthermore, the product weight arrays 520 may be configured to have more or less than eight allocation weights, depending on the number of categories of products or services that is selected for the product facet. A skilled practitioner will recognize that the categorization scheme that is defined for a facet determines the number of elements in the weight arrays for that facet.

The weight arrays 165 shown in FIG. 5 include five types of weight arrays. It will be apparent to a skilled practitioner that the weight arrays 165 can include other types of weight arrays corresponding to other facets by which costs can be organized. In one embodiment of the present invention, the allocation weights are limited to integers. Alternatively, the allocation weights can include real numbers or any other codes that can specify a relative weighting scheme.

FIG. 6A is a diagram illustrating the relationship between the allocation data structures 160 according to an example embodiment. In the example described with reference to FIGS. 6B, 7, 8, 9 and 10 below, a $1000 distribution activity cost is allocated by product and sales channel using the total weight of orders as a cost driver. It will be apparent to one skilled in the art that the illustrated method can be extended to three or more facets, other cost driver types and other activities. The allocation data structures 160 include a channel weight array 695 having a set of allocation weights 601-603, a product weight array 696 having a set of allocation weights 641-648 and a cost driver array 170 having a set of cost driver objects 611-634.

FIG. 6B is a representation of an embodiment of the cost driver array 170. A set of indices 691 includes a channel ID and a product ID. The channel ID selects an element from the channel weight array 695 and a corresponding column of the cost driver array 170. The product ID selects an element from the product weight array 696 and a corresponding row of the cost driver array 170 shown in FIG. 6A. A cost driver ID selects one of a set of cost driver types 692. In the example of FIG. 6A, the cost driver ID is configured to select the total weight of orders to allocate costs for the distribution activity. It will be apparent to one skilled in the art that the cost driver ID for each activity can be independently selected.

Figure 7:
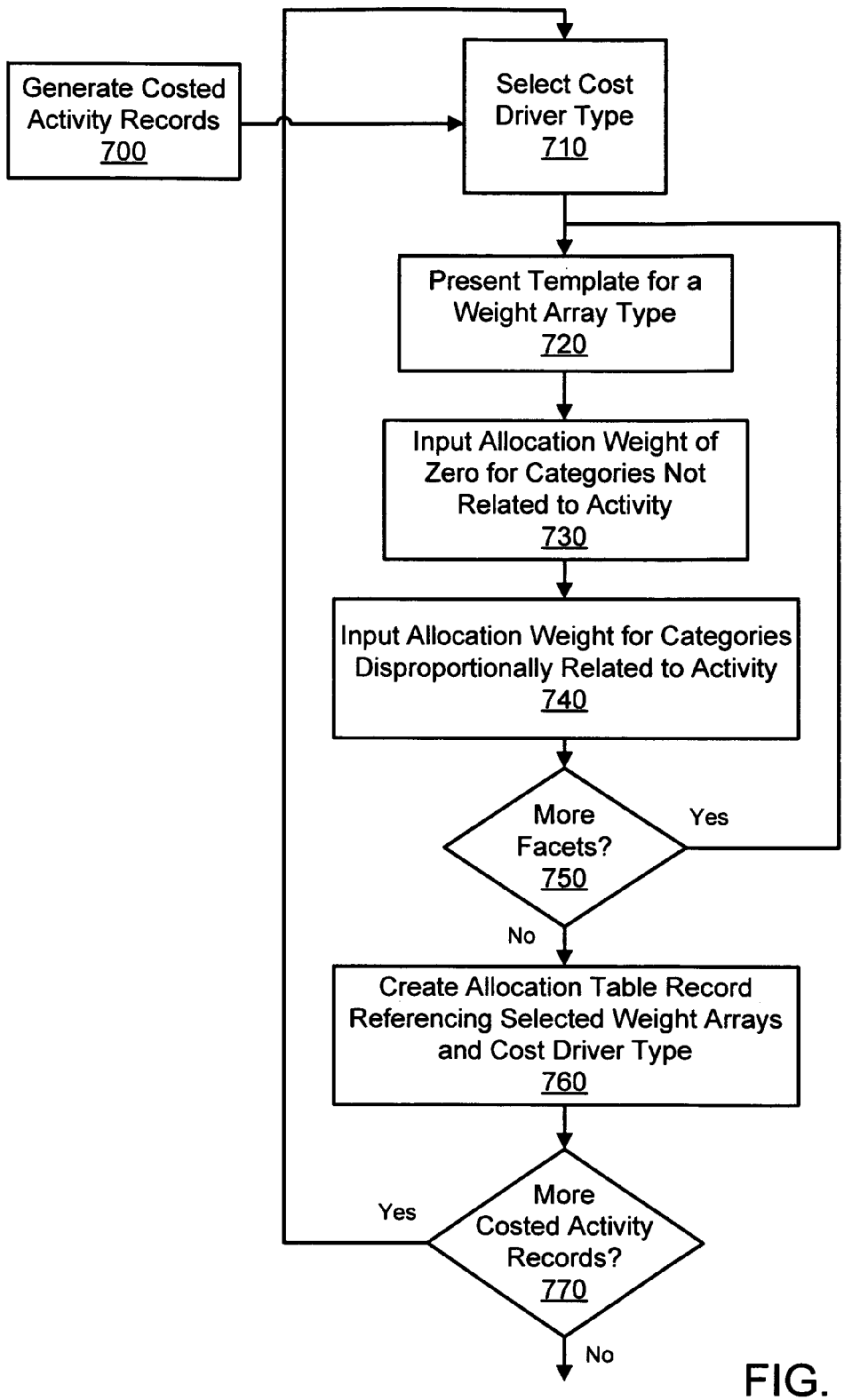
FIG. 7 is a flow diagram showing a method of configuring allocation data structures according to an embodiment.

FIG. 7 is a flow diagram showing a method of configuring allocation data structures according to an embodiment.

In step 700, the costed activity records are created. In one embodiment, the costed activity records are generated using the allocation data structures created in the process described with reference to FIG. 4. It will be apparent to one skilled in the art that other methods for generating costed activity records can be used. The next step performed is step 710.

In step 710, a cost driver type is selected for a costed activity records. In one embodiment, the cost driver array 170 is configured as shown in FIG. 6B, having the set of cost driver types 692 including revenue, direct cost of goods sold, the number of transactions, the number of units sold, the number of line items on an order, the number of orders, the number of returns, the number of shipments, the number of coupons used, the number of credit card transactions, the number of cash transactions, the number of check transactions, the total weight of orders, and the total volume of orders.

The cost driver type is selected based on the activity associated with the costed activity element. The process of selecting the cost driver type is performed by having a cost driver ID reference one of the cost driver types 692. It will be apparent to one skilled in the art that the cost driver types 692 can include additional cost driver types and omit some of the aforementioned cost driver types. In one embodiment, there is only a single cost driver type. The next step performed is step 720.

In step 720, a template for a weight array is presented for the costed activity element. Each time the step 720 is performed for a particular costed activity element, the template for the weight array corresponds to a different facet. With reference to the set of weight arrays 165 as illustrated in FIG. 3, the template corresponding to the product weight arrays 320, for example, has eight cells, each cell corresponding to one of the product categories. Similarly, the template corresponding to the channel weight arrays 340 has three cells, each cell corresponding to one of the sales channel categories. In one embodiment, each of the cells in the template for each weight array is set to a default value of one. The next step performed is step 730.

In step 730, a zero is input into each cell of the weight array that corresponds to a facet category that is not related to the costed activity. With reference to FIG. 6A, when configuring the channel weight array 695 for the costed activity element associated with a distribution activity, the element 603 is assigned a zero because the category of channel types associated with the element 603, vendor direct shipments, does not incur a distribution cost. In this case, the vendor direct shipment activity is not related to the distribution activity. It will be apparent to one skilled in the art that other values and/or symbols may be used to indicate the lack of a relationship between a category of a facet and the costed activity. The next step performed is step 740.

Is step 740, numbers are input into each cell of the weight arrays that correspond to a facet category that is disproportionately related to the costed activity relative to the cells corresponding to the other categories for that facet. The number represents the allocation weight for that facet category. In one embodiment, the number is other than zero, which indicates no relationship, and one, which indicates a uniform relationship. With reference to the channel weight array 695 illustrated in FIG. 6A, the element 602 is assigned an allocation weight of three because special deliveries incur a disproportionate share of distribution costs relative to other channel weight array categories. The next step performed is step 750.

In step 750, it is determined whether there are any more facets for this costed activity record. If there are more facets for this costed activity record, step 720 is performed for one of the remaining facets. Otherwise, step 760 is performed.

In step 760, a record is created in the allocation table 175. The record in the allocation table 175 refers to the selected weight arrays and cost driver type for the costed activity record. In the case in which the steps 720-750 define a weight array with a unique combination of allocation weights among the weight arrays for that facet, a new record is created with that combination of allocation weights in the weight array table for that facet. The allocation table record is configured to refer to the new record in the weight array table for that facet. In the case in which the steps 720-750 define a weight array that has an identical combination of allocation weights for that facet, a new record is not created in the weight array table for that facet. Instead, the allocation table is configured to refer to the previously configured weight array having that combination of allocation weights. The next step performed is step 770.

In step 770, it is determined whether there are any more costed activity records. If there are additional costed activity records, the next step performed is step 710 to configure the allocation data structures 160 for another one of the costed activity records. If there are no additional costed activity records, the flow diagram is completed.

Figure 8:
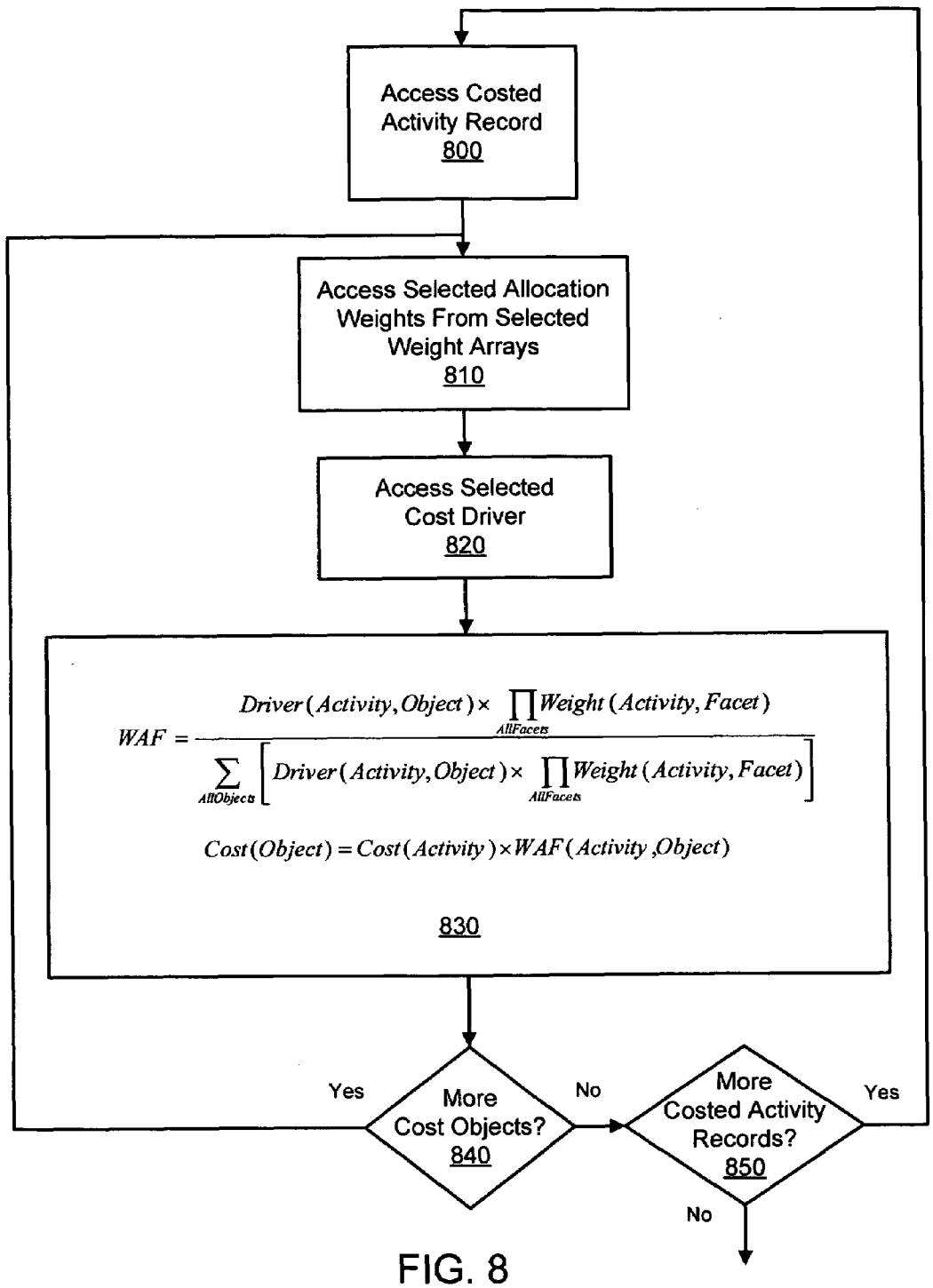
FIG. 8 is a flow diagram of a method of allocating costs using a set of allocation data structures according to one embodiment.

FIG. 8 is a flow diagram of a method of allocating costs using a set of allocation data structures according to one embodiment.

In step 800, a costed activity record is accessed. In this example, the costed activity element is $1000 of cost allocated to a distribution activity. The costed activity element does not have any facet IDs associated with it.

In step 810, selected allocation weights from selected weight arrays are received. In this example, the selected weight arrays are the product weight array 696 and the channel weight array 695. A combination of selected elements of the weight arrays corresponding to a particular cost object is accessed. The element 642 of the product weight array 696 and element 601 of the channel weight array 695 provide the selected allocation weights from the selected weight arrays. The next step performed is step 820.

In step 820 a selected cost driver is accessed. For example, the cost driver object 614 is associated with the combination of the element 642 and the element 601, selected in step 810. With reference to FIG. 6B, a cost driver ID selects the record corresponding to one of the set of cost driver types 692 associated with the cost driver object associated with each combination of channel ID and product ID. In this example, the total weight of orders is selected as the cost driver for the distribution activity. The selected cost driver object 614 has a total weight of orders cost driver type having a value of 454 pounds as shown in FIG. 6A. The next step performed is step 830.

In step 830, the allocated cost for a cost object is computed based on the selected allocation weights and the selected cost driver for that cost object and that costed activity record. One embodiment of this process is described with reference to equation 1 and illustrated in FIG. 10.

Equation 1 is a representation of an allocation computation of the present invention. Each activity cost is allocated among multiple cost objects, represented as Cost(Object), by multiplying the activity cost, represented as Cost(Activity), by a corresponding weighted allocation factor, represented as WAF(Activity,Object), corresponding to that activity and cost object.

$$\text{Cost(Object)} = \text{Cost(Activity)} \times \text{WAF(Activity,Object)} \quad \text{Equation 1}$$

Equation 2 is a representation of the computation of the weighted allocation factor according to the present invention. Each weighted allocation factor for a particular activity and cost object is calculated as the product of the cost driver corresponding to the activity and the cost object, represented below as Driver(Activity,Object), and the product of the allocation weights corresponding to the activity, each represented below as Weight(Activity,Object, Facet) for all the facets of the cost object, divided by the sum of these products over all the cost objects.

$$WAF(\text{Activity, Object}) = \frac{\text{Driver(Activity, Object)} \times \prod_{\text{AllFacets}} \text{Weight(Activity, Facets)}}{\sum_{\text{AllObjects}} \left[ \text{Driver(Activity, Object)} \times \prod_{\text{AllFacets}} \text{Weight(Activity, Facets)} \right]} \quad \text{Equation 2}$$

In a step 840, it is determined whether there are more cost objects. With reference to FIG. 6A, the potential number of cost objects is the product of the number of allocation weights in the channel weight array 695 and the number of allocation weights in the product weight array 696, in that case three times eight or 24 potential cost objects. However, some cost objects may not have any of the activity cost allocated to them.

If there are more cost objects, the next step performed is step 810. In this next iteration of steps 810-830, the selected allocation weights and the selected cost driver correspond to the next cost object. If there are no more cost objects, the next step performed is step 850.

In step 850, it is determined whether there are any more costed activity records. If there are more costed activity records, the next step performed is the step 800. In this next iteration of steps 800-840, another costed activity record is accessed and the activity ID from that costed activity record selects a record in the allocation table 175. The record in the allocation table 175 specifies the selected weight arrays and the selected cost driver for that iteration. If there are no more costed activity records, the flow diagram is completed.

Figure 9:
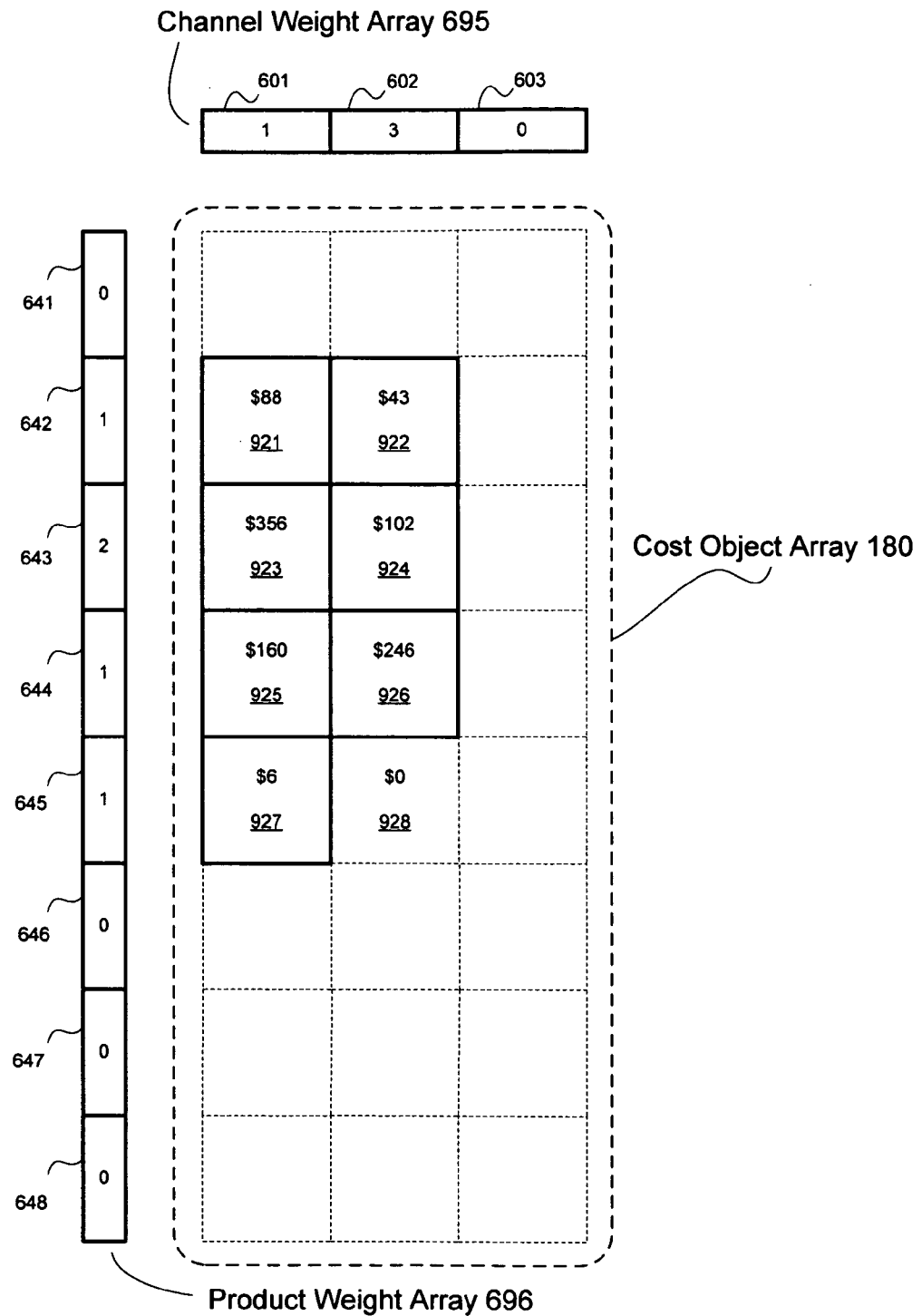
FIG. 9 is a diagram of the relationship between the cost object array and the weight arrays according to an example embodiment.

FIG. 9 is a diagram of the relationship between the cost object array 180 and the weight arrays according to an example embodiment. The column of the cost object array 180 corresponding to the element 603, which has an allocation weight of zero, and the rows of the cost object array 180 corresponding to the element 641 and the elements 646-648, which have allocation weights of zero, are not allocated any of the distribution costs because a zero allocation weight results in a weighted allocation factor of zero. Similarly, each cost object associated with the cost objects array 180 has a corresponding cost driver objects in the cost driver array 170. The cost object 928 is associated with the cost driver object 624 having a cost driver value of zero. Cost object 928 is not allocated any of the distribution costs because a zero cost driver results in a weighted allocation factor of zero. In one embodiment, the $1000 distribution activity costs are allocated to the cost objects 921-928 as described in detail in FIG. 10. FIG. 11 illustrates an alternative embodiment of the allocation of $1000 in distribution activity costs to the cost objects 921-928.

FIG. 10 is a table showing allocation values used in the allocation method for the example embodiment described with reference to FIG. 9.

A Table 1 shown in FIG. 10 includes rows for each combination of channel ID and product ID corresponding to cost objects to which some costs are allocated. The costs are allocated using the equations 1 and 2 applied to the data structures of FIG. 6A. In Table 1, the reference numeral for the elements of the channel weight array 695 and the product weight array 696 and the cost objects in the cost object array 180 are used as the channel ID, the product ID and the cost object ID, respectively. It will be apparent to one skilled in the art that other values can be used.

The first row of Table 1 are the allocation values used to calculate the allocated cost for the cost object 921. The first row shows the element 601 having a channel allocation weight of one and the element 642 having a product allocation weight of one and the corresponding cost driver object 614 indicating the weight of orders is 454 pounds. The numerator of the weighted allocation factor is the product of the selected channel allocation weight, the selected product allocation weight and the selected cost driver. The denominator of the weighted allocation factor is the sum of the numerators for the weighted allocation factors for all the cost objects. The denominator is used to normalize the weighted allocation factors across all of the cost objects such that the sum of the weighted allocation factors is one, allowing for rounding error. The result is that when multiplying each of the weighted allocation factors to an activity cost to produce allocated activity costs for each cost object, the sum of the allocated activity costs will be no more or less than the activity cost, allowing for rounding error. In this example, the $1000 distribution activity cost is multiplied by the weighted allocation factor in each row to produce the allocated cost for that row. The allocated cost calculated for row 1 is allocated to the cost object 921. The allocation values in each row of the Table 1 is processed in a similar way.

FIG. 11 is a table showing allocation values used in the allocation method for an alternative example embodiment.

A Table 2 shown in FIG. 11 includes rows for each combination of channel ID and product ID corresponding to cost objects to which some costs are allocated. The costs are allocated to the cost objects using the equations 1 and 2 applied to the data structures of FIG. 6A. The reference numerals are used for the channel ID, product ID and cost object ID as described with reference to FIG. 10.

In this alternative embodiment, the $1000 distribution activity cost is associated with two costed activity records. The first costed activity record has a $400 distribution activity cost indexed by a channel ID of 601 and the second costed activity record has a $600 distribution activity cost indexed by a channel ID of 602. The allocation method is similar to that described with reference to FIG. 10, except that the rows associated with a channel ID of 601 are processed distinctly from the rows that are associated with a channel ID of 602.

In this embodiment, the activity index code in the costed activities table 320 would show that these two costed activity records have a channel index but not a product index. The query writer would join the channel ID in the costed activities table 320 to the channel ID in the cost driver array 170 so that only the cost driver objects associated with the specified channel ID are included in the calculation for that costed activity record.

The first row of Table 2 shows the element 642 having a product allocation weight of one and the corresponding cost driver object 614 indicating the weight of orders is 454 pounds. The channel allocation weights for the element 601 is not applicable, because the distribution activity cost for the costed activity record associated with this row is already allocated to the channel ID of 601. The numerator of the weighted allocation factor is the product of the selected product allocation weight and the selected cost driver. The denominator of the weighted allocation factor is the sum of the numerators for the weighted allocation factors for all the cost objects associated with this costed activity record. In this case, rows 3, 5, and 7 also have channel IDs of 601. In this example the $400 activity cost indexed by a channel ID of 601 is multiplied by the weighted allocation factor in rows 1, 3, 5 and 7 to produce the allocated cost for the respective rows. The $400 distribution activity cost is allocated to the cost objects specified by the respective cost object ID for those rows.

Rows 2, 4 and 6 in Table 2 are processed similarly to the other rows except that the costed activity element associated with these rows has a channel ID of 602. Row 2 shows the element 642 having a product allocation weight of one and the corresponding cost driver object 614 indicating the weight of orders is 74 pounds. The channel allocation weights for the element 601 is not applicable, because the distribution activity cost for the costed activity record associated with this row is already allocated to the channel ID of 602. The numerator of the weighted allocation factor is the product of the selected product allocation weight and the selected cost driver. The denominator of the weighted allocation factor is the sum of the numerators for the weighted allocation factors for all the cost objects associated with this costed activity record. In this case, rows 4 and 6 also have channel IDs of 602. In this example, the $600 distribution activity cost indexed by a channel ID of 602 is multiplied by the weighted allocation factor in rows 2, 4 and 6 to produce the allocated cost for the respective rows. The $600 distribution activity cost is allocated to the cost objects specified by the respective scost object IDs for those rows.

Figure 12:
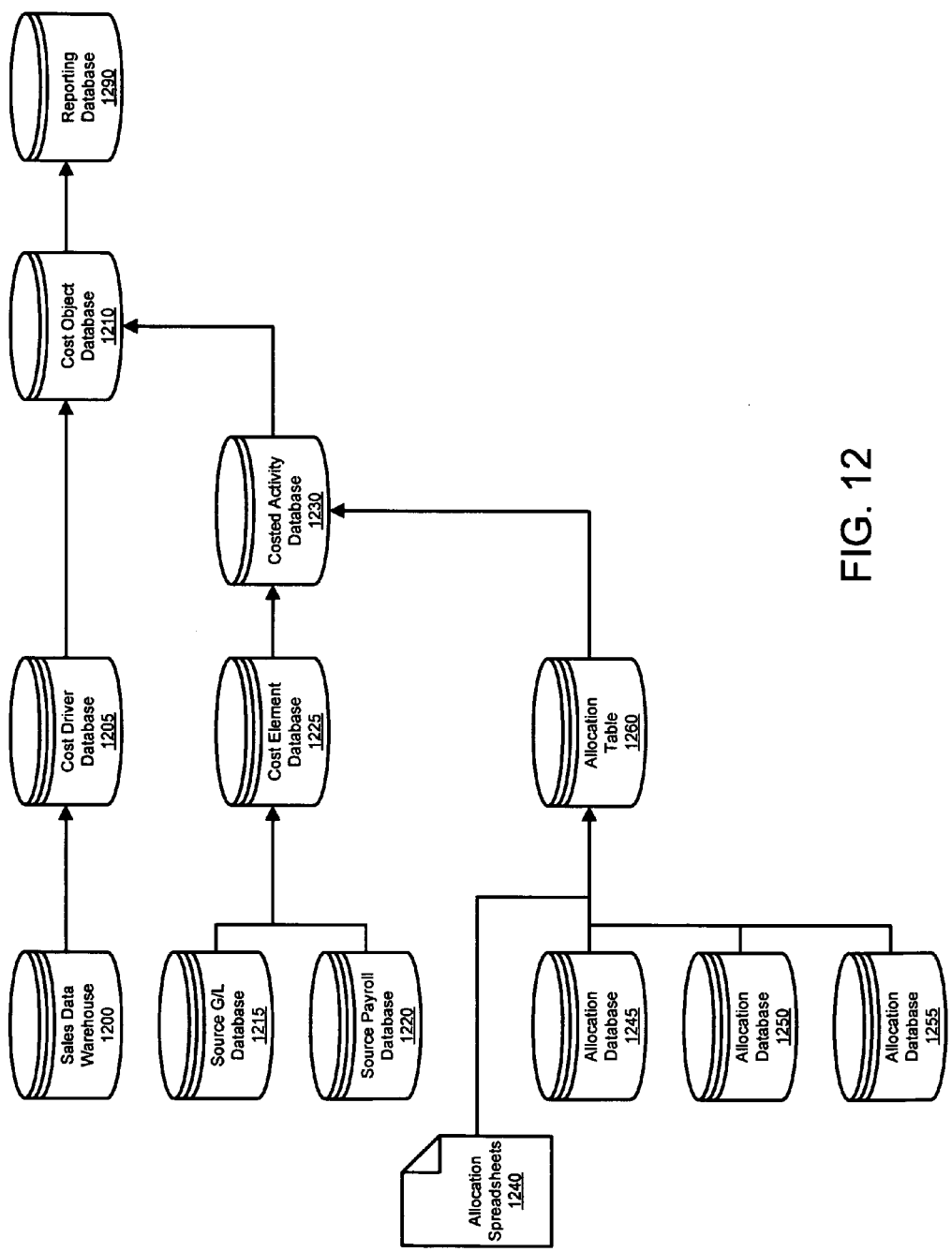
FIG. 12 is a block diagram of the physical architecture of an embodiment.

FIG. 12 is a block diagram of the physical architecture of an embodiment. A sales data warehouse 1200 is a database or group of data sources that contains sales transaction information. The sales transaction information can be mined to produce the cost driver database 1205, which organizes the sales transaction information according to various facets stored with such sales transactions. Facets can include geographic locations for the sales, customer names, stocking units, sales channels, prices and salesperson names, for example.

A source general ledger database 1215 and a source payroll database 1220 are mined to produce a cost element database 1225. Each cost element is a cost associated with a particular department code, account code and group code. One skilled in the art will recognize that there are many data sources that can be used to create a cost record database 1225.

A set of allocation spreadsheets 1240 include information such as the weight arrays 165, cost driver IDs and the first stage allocation table 305 and the second stage allocation table 310 described herein. The allocation databases 1245, 1250 and 1255 include available data used as a basis for directly allocating costs in the first stage allocation table 305 and the second stage allocation table 310 as described herein. The allocation spreadsheets 1240 and the allocation databases 1245, 1250 and 1255 are used to generate a costed activities database 1230 in which the cost records are allocated to activities and facets as far as direct allocation can be applied. The cost elements database 1225, the allocation spreadsheets 1240 and the allocation databases 1245, 1250 and 1255 are also used to create an allocation table 1260 as described herein.

The allocation table 1260 is used to allocate each costed activity record to the cost object array 180 as described herein. The costed activity records are allocated to cost objects corresponding to facets of the organization. In one embodiment, the cost object array 180 is merged with of the revenue objects in the cost object database 1210. By computing the difference between each revenue object and the corresponding cost object, profit and loss may be determined for each object within the classification system defined by the facets.

The reporting database 1290 is used to store reports based on the cost object database 1210 such as the activity based costing reports 150.

In this detailed description, numerous specific details are set forth in order to illustrate the present invention by example. This detailed description is not meant to be exhaustive or to limit the invention to the precise description. Some of the specific details need not be used to practice the invention. Other instances, methods, data structures and apparatus have not been shown or described. It will be apparent to one skilled in the art that many modifications and variations of the examples described herein are within the spirit and scope of the present invention. It is intended that the scope of the invention be defined by the following claims and their equivalents.

What is claimed is:

1. A machine-readable medium that provides instructions for a processor which when executed by the processor cause the processor to perform a method of allocating an activity cost among a plurality of cost objects, the plurality of cost objects being an array having dimensions corresponding to a plurality of facets of an organization, the method comprising:

selecting a plurality of allocation weights each from a corresponding one of a plurality of weight arrays, each of the selected plurality of allocation weights corresponding to a category in one of the plurality of facets;

selecting a cost driver from a cost driver array having a plurality of cost drivers, the selected cost driver corresponding to a category in each of the plurality of facets;

calculating a weighted allocation factor by applying a function to the selected cost driver and the selected plurality of allocation weights, wherein the weighted allocation factor is normalized across the plurality of cost objects;

calculating an allocated activity cost by multiplying the activity cost by the weighted allocation factor;

selecting one of the plurality of cost objects, the selected cost object corresponding to a category in each of the plurality of facets; and creating a record comprising the allocated activity cost, the allocated activity cost being allocated to the selected cost object.

2. The machine-readable medium of claim 1 wherein the step of selecting the selected cost driver comprises selecting the selected cost driver from a plurality of cost drivers each corresponding to one of a plurality of cost driver types.

3. The machine-readable medium of claim 1 wherein the step of calculating the weighted allocation factor comprises:

multiplying the selected cost driver and the product of the selected plurality of allocation weights to compute an intermediate product; and scaling the intermediate product to compute the weighted allocation factor.

4. The machine-readable medium of claim 1 wherein the method further comprises:

linking the record for the allocated activity cost to the activity cost.

5. The machine-readable medium of claim 1 wherein the method further comprises:

querying a database to select a plurality of records corresponding to at least one cost object, each record including a link to a corresponding one of a plurality of cost elements, each of the plurality of cost elements being associated with one of a plurality of general ledger accounts; and reporting cumulative cost by each general ledger account for the selected records.

6. The machine-readable medium of claim 1 wherein the method further comprises:

allocating a cost element to at least one costed activity element each costed activity element being associated with one of a plurality of activities, one of the at least one costed activity element being the activity cost; and linking the record for the allocated activity cost to the cost element.

7. The machine-readable medium of claim 1 wherein the weighted allocation factor is normalized across the plurality of cost objects such that the sum of the weighted allocation factors associated with the plurality of cost objects is approximately one allowing for rounding error.

8. A system for performing activity based cost modeling wherein an activity cost is allocated among a plurality of cost objects, the plurality of cost objects being an array having dimensions corresponding to a plurality of facets of an organization, the system comprising:

a memory configured to store a plurality of weight arrays each having a plurality of allocation weights, the memory being further configured to store a cost driver array having a plurality of cost drivers; and a processor coupled to the memory and configured to select the plurality of allocation weights each from a corresponding one of the plurality of weight arrays and a one of the plurality of cost drivers each of the selected plurality of allocation weights corresponding to a category in one of the plurality of facets, the selected cost driver corresponding to a category in each of the plurality of facets, the processor being further configured to calculate a weighted allocation factor by applying a function to the selected cost driver and the selected plurality of allocation weights, wherein the weighted allocation factor is normalized across the plurality of cost objects, the processor being further configured to calculate an allocated activity cost by multiplying the activity cost by the weighted allocation factor, the processor being further configured to select one of the plurality of cost objects, the selected cost object corresponding to a category in each of the plurality of facets and the processor being further configured to create a record comprising the allocated activity cost, the allocated activity cost being allocated to the selected cost object.

9. The system of claim 8 wherein the processor is configured to select the selected cost driver corresponding to one of a plurality of cost driver types based on an activity corresponding to the activity cost.

10. The system of claim 8 wherein the processor is configured to calculate the weighted allocation factor by multiplying the selected cost driver and the selected plurality of allocation weights to compute an intermediate product; and scaling the intermediate product to compute the weighted allocation factor.

11. The system of claim 8 wherein the record comprises a link to the activity cost.

12. The system of claim 8 wherein the memory further comprises a plurality of records corresponding to at least one cost object, each record including a link to a corresponding one of a plurality of cost elements, each of the plurality of cost elements being associated with one of a plurality of general ledger accounts and the processor being further configured to select one or more records from the plurality of records and report the cumulative cost by each general ledger account for the selected records.

13. The system of claim 8 wherein the processor is configured to allocate a cost element to each of at least one costed activity element each costed activity element being associated with one of a plurality of activities, one of the at least one costed activity element being the activity cost, the processor being further configured to link the record for the allocated activity cost to the cost element.

14. The system of claim 8 wherein the weighted allocation factor is normalized across the plurality of cost objects such that the sum of the weighted allocation factors associated with the plurality of cost objects is approximately one allowing for rounding error.

* * * * *